(12) United States Patent
Sakai

(10) Patent No.: US 8,794,401 B2
(45) Date of Patent: Aug. 5, 2014

(54) FLUID SHOCK ABSORBER

(75) Inventor: Shizuka Sakai, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 758 days.

(21) Appl. No.: 12/382,036

(22) Filed: Mar. 6, 2009

(65) Prior Publication Data

US 2009/0223758 A1    Sep. 10, 2009

(30) Foreign Application Priority Data

Mar. 7, 2008   (JP) .................................. 2008-58246

(51) Int. Cl.
| F16F 9/32 | (2006.01) |
| F16F 9/36 | (2006.01) |
| F16J 15/32 | (2006.01) |
| F16F 7/09 | (2006.01) |
| F16J 15/56 | (2006.01) |

(52) U.S. Cl.
CPC . *F16J 15/56* (2013.01); *F16F 9/36* (2013.01); *F16J 15/324* (2013.01); *F16F 7/09* (2013.01); *F16J 15/322* (2013.01); *F16J 15/3208* (2013.01)
USPC .................................................... 188/266.7

(58) Field of Classification Search
CPC . F16F 15/005; F16F 2224/0283; F16F 15/03; F16F 9/46; B60G 2401/10; B60G 17/018; B60G 17/01941
USPC .............. 188/271, 266.1, 266.7, 267, 322.16, 188/322.17, 299.1; 277/317, 551, 553, 435, 277/437, 470, 471, 468
See application file for complete search history.

(56) References Cited

U.S. PATENT DOCUMENTS

| 4,898,027 | A | * | 2/1990 | Morra ........................ 73/117.01 |
| 5,293,969 | A | * | 3/1994 | Yamaoka et al. .......... 188/266.5 |
| 5,653,315 | A | * | 8/1997 | Ekquist et al. ............. 188/266.4 |
| 6,405,841 | B1 | * | 6/2002 | Zeno .............................. 188/267 |
| 6,749,048 | B2 | * | 6/2004 | Coombs ................... 188/322.17 |
| 8,016,087 | B2 | * | 9/2011 | Murakami et al. ............ 188/267 |
| 2005/0016802 | A1 | * | 1/2005 | Akami et al. ................. 188/267 |
| 2006/0096815 | A1 | * | 5/2006 | Kondo et al. .............. 188/266.5 |
| 2007/0144842 | A1 | * | 6/2007 | Zhou ............................. 188/267 |

FOREIGN PATENT DOCUMENTS

| DE | 43 02 262 A1 | 8/1994 |
| EP | 1 270 955 A2 | 1/2003 |
| JP | H08-226546 | 9/1996 |
| JP | 2003-269518 A | 9/2003 |
| JP | 2007-120514 | 5/2007 |

* cited by examiner

*Primary Examiner* — Vishal Sahni
(74) *Attorney, Agent, or Firm* — Rabin & Berdo, P.C.

(57) ABSTRACT

A shock absorber (D1) comprises a ring-shaped seal member (3) supported by a cylinder (1) so as to cause a tip to contact the piston rod (2) resiliently. A ring-shaped actuator (4a) exerts an inward force on the outer circumference of the seal member (3). The actuator (4a) is constituted by a polymer material that varies its diameter upon impression of a direct-current voltage. By controlling the direct-current voltage depending on the relative displacement speed between the piston rod (2) and the cylinder (1), the frictional resistance which the seal member (3) exerts on the piston rod (2) is kept large when the relative displacement speed is in an extremely low operation speed region, and is decreased as the actuator (4) decreases the inward force when the relative displacement speed increases above the extremely low operation speed region.

7 Claims, 3 Drawing Sheets

FLUID SHOCK ABSORBER

FIELD OF THE INVENTION

This invention relates to a sealing structure of a fluid shock absorber.

BACKGROUND OF THE INVENTION

A linear motion fluid shock absorber generally comprises a cylinder and a cylinder-inserted body such as a piston rod inserted into the cylinder, and generates a damping force by promoting fluid pressure loss within the shock absorber as the cylinder-inserted body elongates and contracts relative to the cylinder. In such a linear motion fluid shock absorber, it is indispensable to provide a seal member between the cylinder and the cylinder-inserted body so as to prevent working fluid from leaking to the outside from the cylinder and dust from invading the cylinder from the outside.

JPH08-226546A published by the Japan Patent Office in 1996 and 2007-120514A published by the Japan Patent Office in 2007 propose a supporting structure for a seal member to accomplish this purpose.

SUMMARY OF THE INVENTION

In a shock absorber for a vehicle, it is necessary to generate a damping force firmly even when the shock absorber operates in an extremely low operation speed region as in a case where the vehicle changes lanes at a high running speed while preserving a preferable damping force characteristic in a operation speed region above the extremely low operation speed region.

However, when the operation speed of the fluid shock absorber is in the extremely low operation speed region and the amplitude of oscillation is small, the shock absorber may not generate a sufficient damping force to suppress the oscillation due to a deficiency in the flow amount passing through a fluid damping force generating mechanism or a lack of movement of fluid between fluid chambers in the cylinder depending on the compressibility of the fluid. When the fluid damping force generating mechanism does not function as expected, the damping force generated by the shock absorber is only a sum of a resilient force and a frictional resistance of the seal member, which is deformed in accordance with relative displacement of the cylinder-inserted body and the cylinder. It is apparent that the shock absorber cannot generate the required damping force in this situation. Even in a shock absorber employing an electromagnetic damping force generating mechanism, a shortage of damping force is apt to occur in an extremely low operation speed region.

A method of generating a sufficient damping force in an extremely low operation speed region is to increase a contact force between the seal member and the cylinder-inserted body so as to increase the frictional resistance therebetween. However, increased frictional resistance between the cylinder-inserted body and the seal member may prevent smooth relative motion between the cylinder-inserted body and the cylinder at a high operation speed, which adversely affects the riding comfort of the vehicle.

It is therefore an object of this invention to ensure a sufficient damping force to suppress oscillation in an extremely low operation speed region of a fluid shock absorber for a vehicle without affecting riding comfort of the vehicle.

In order to achieve the above object, this invention provides a fluid shock absorber comprising a cylinder, a cylinder-inserted body inserted into the cylinder, a damping force generating mechanism that generates a fluid damping force against a relative displacement of the cylinder-inserted body and the cylinder in an axial direction, a seal member interposed between the cylinder and the cylinder-inserted body, and a frictional resistance regulating mechanism that regulates a frictional resistance between the seal member and one of the cylinder and the cylinder-inserted body.

The details as well as other features and advantages of this invention are set forth in the remainder of the specification and are shown in the accompanying drawings.

DESCRIPTION OF THE PREFERRED EMBODIMENTS

Figure 1:
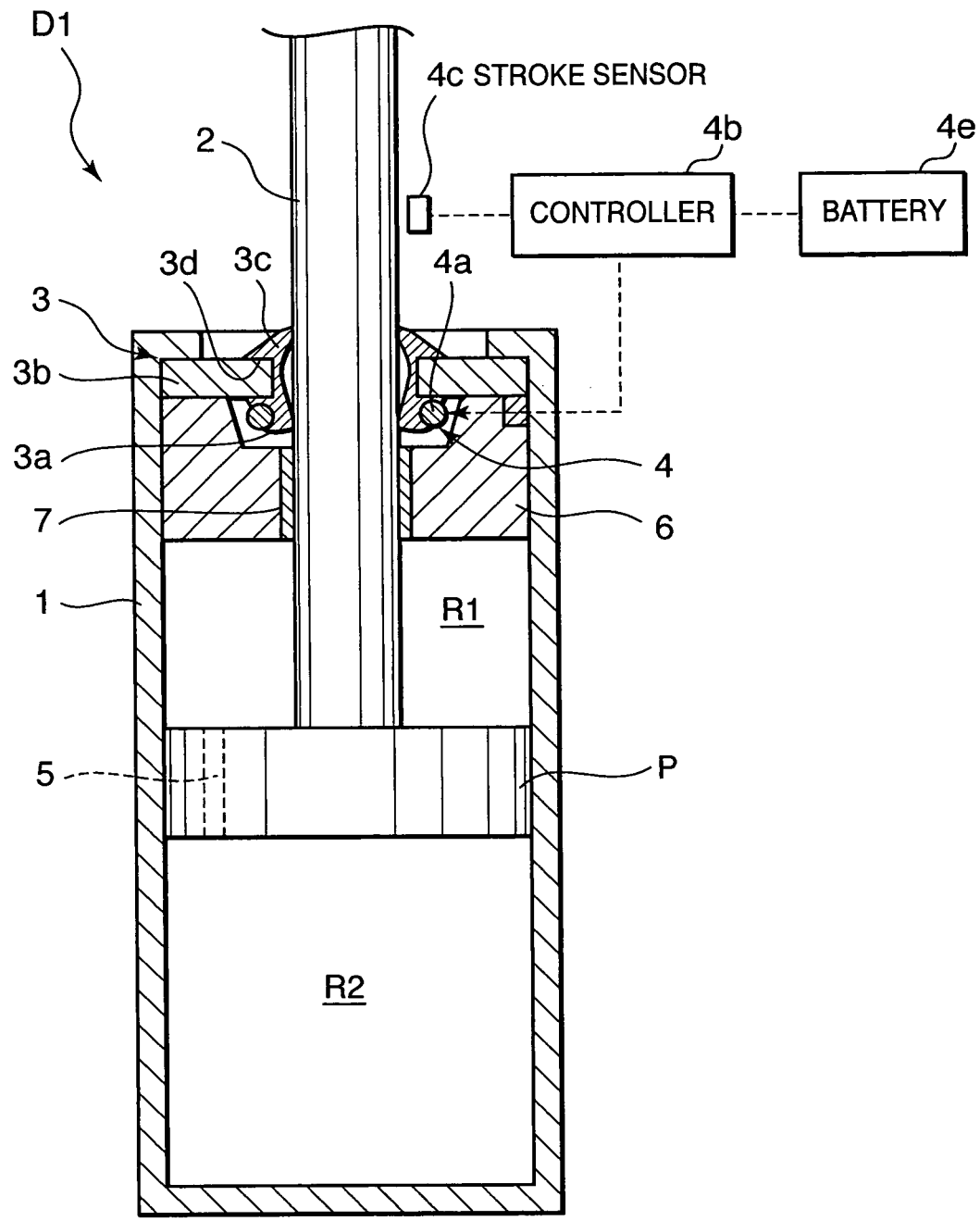
FIG. 1 is a schematic diagram of a hydraulic shock absorber according to this invention.

Referring to FIG. 1 of the drawings, a hydraulic shock absorber D1 for a vehicle comprises a cylinder 1, a piston rod 2 inserted into the cylinder 1 from an axial direction as a cylinder-inserted body, and a piston P fixed to a tip of the piston rod 2 in the cylinder 1. The piston P is fitted into the inner circumference of the cylinder 1 so as to be free to slide, and separates an inner space of the cylinder 1 into an oil chamber R1 on a side of the piston rod 2 and an oil chamber R2 on the opposite side.

A choke 5 connecting the oil chambers R1 and R2 is formed through the piston P as a damping force generating mechanism. The choke 5 allows working oil to move from the oil chamber R1 to the oil chamber R2 when the piston rod 2 strokes in an elongation direction of the piston rod 2, and generates an elongation damping force depending on a stroke speed of the piston P. The choke 5 allows working oil to move from the oil chamber R2 to the oil chamber R1 when the piston rod 2 strokes in a contraction direction of the piston rod 2, and generates a contraction damping force depending on a stroke speed of the piston P.

The sum of the capacity of the oil chamber R1 and the capacity of the oil chamber R2 varies as an invasion volume of the piston rod 2 into the cylinder 1 varies, or in other words depending on the elongation/contraction state of the hydraulic shock absorber D1. To compensate for this variation in the capacity, a reservoir which supplies working oil to the oil chamber R1 as the hydraulic shock absorber D1 elongates and receives surplus working oil from the oil chamber R1 when the hydraulic shock absorber D1 contracts is provided on the outside of the cylinder 1.

It should be noted that a reservoir is required in the hydraulic shock absorber D1, which is filled with incompressible working oil as working fluid, but the reservoir is not required in a gas shock absorber which is filled with compressible gas as working fluid.

A seal member 3 having a supporting structure as described below is interposed between the cylinder 1 and the piston rod 2.

The hydraulic shock absorber D1 comprises a rod guide 6 provided at a tip of the cylinder 1 for closing an opening of the cylinder 1 and supporting the piston rod 2. The piston rod 2 penetrates the rod guide 6 via a collar-shaped bearing 7. A lip retaining ring 3b is gripped between the rod guide 6 and the tip of the cylinder 1 in the axial direction. The seal member 3 is provided with a ring groove 3d on its outer circumference. By fitting the inner circumference of the lip retaining ring 3b into this ring groove 3d, the seal member 3 is supported by the lip retaining ring 3b.

The inner circumferential part of the seal member 3 is divided into an oil lip 3a, a tip of which is in contact with the outer circumference of the piston rod 2 below the lip retaining ring 3b, and a dust lip 3c, a tip of which is in contact with the outer circumference of the piston rod 2 above the lip retaining ring 3b.

The oil lip 3a has a function to prevent working oil from leaking out of the cylinder 1 by scraping away working oil adhered to the outer circumference of the piston rod 2 when the piston rod 2 performs an elongating action. The dust lip 3c has a function to prevent dust from invading the cylinder 1 by scraping away dust adhered to the outer circumference of the piston rod 2 when the piston rod 2 performs a contracting action.

The hydraulic shock absorber D1 further comprises a frictional resistance regulating mechanism 4 which regulates frictional resistance between the oil lip 3a and the piston rod 2. The frictional resistance regulating mechanism 4 comprises a ring-shaped polymer actuator 4a fitted on the outer circumference of the oil lip 3a, a battery 4e which impresses a direct-current voltage on the polymer actuator 4a, a programmable controller 4b which controls the direct-current voltage impressed on the polymer actuator 4a, and a stroke sensor 4c which detects a relative displacement position of the piston rod 2 and the cylinder 1.

The polymer actuator 4a is made of a conducting polymer material such as polypyrrole, polyaniline, and polythiophene, polymer electrolyte gel, or an ion-exchange membrane. In other words, it is made of a material having a characteristic according to which expansion occurs upon application of a direct current.

Alternatively, the polymer actuator 4a may be constructed from a non-conducting polymer material, as disclosed in JP2001-258275A published by the Japan Patent Office in 2001.

The polymer actuator 4a is fitted onto the outer circumference of the oil lip 3a. The polymer actuator 4a has a pair of electrodes. By applying a direct current to these electrodes from the battery 4e provided outside the cylinder 1 via the controller 4b, the polymer actuator 4a expands and decreases the inward force which the polymer actuator 4a exerts on the oil lip 3a. A decrease in the inward force causes the frictional resistance between the oil lip 3a and the piston rod 2 to decrease. The inward force which the polymer actuator 4a exerts on the oil lip 3a decreases as the controller 4b increases the direct current applied to the electrodes of the polymer actuator 4a.

The controller 4b is constituted by a microcomputer comprising a central processing unit (CPU), a read-only memory (ROM), a random access memory (RAM), and an input/output interface (I/O interface). The controller may be constituted by a plurality of microcomputers.

The controller 4b is programmed as follows.

Specifically, the controller 4b is programmed to monitor a relative displacement speed of the piston rod 2 and the cylinder 1 in the axial direction, which is obtained as a differential of signals input from the stroke sensor 4c.

The controller 4b is further programmed not to apply the direct-current voltage of the battery 4e to the electrodes of the polymer actuator 4a when the relative displacement speed is in an extremely low operation speed region. When no direct current is applied to the electrodes, the inward force which the polymer actuator 4a exerts on the oil lip 3a reaches a maximum and the frictional resistance between the oil lip 3a and the outer circumference of the piston rod 2 also reaches a maximum.

When the relative displacement speed is increased above the extremely low operation speed region, the controller 4b starts to apply the direct-current voltage of the battery 4e to the electrodes of the polymer actuator 4a. Upon impression of the direct-current voltage, the polymer actuator 4a starts to expand such that the inward force exerted on the oil lip 3a decreases. As a result, the frictional resistance between the oil lip 3a and the piston rod 2 also decreases. Once the relative displacement speed has become higher than the extremely low operation speed region, the controller 4b is programmed to increase the direct current applied to the electrodes of the polymer actuator 4a as the relative displacement speed increases.

The controller 4b performing the above control may also be constituted by an analog electronic circuit.

The hydraulic shock absorber D1 is provided with the frictional resistance regulating mechanism 4 which regulates frictional resistance between the seal member 3 and the piston rod 2, and the controller 4b is programmed not to apply the direct current of the battery 4e to the electrodes of the polymer actuator 4a when the operation speed of the shock absorber D1 is in the extremely low operation speed region. As a result, the hydraulic shock absorber D1 generates a sufficient damping force to suppress oscillation even when the amplitude of the oscillations is small.

When the operation speed of the hydraulic shock absorber D1 becomes higher than the extremely low operation speed region, the controller 4b starts to apply the direct current of the battery 4e to the electrodes of the polymer actuator 4a. As a result, the frictional resistance between the seal member 3 and the piston rod 2 starts to decrease, thereby ensuring smooth elongation/contraction of the hydraulic shock absorber D1 and improving the riding comfort of the vehicle.

Figure 2:
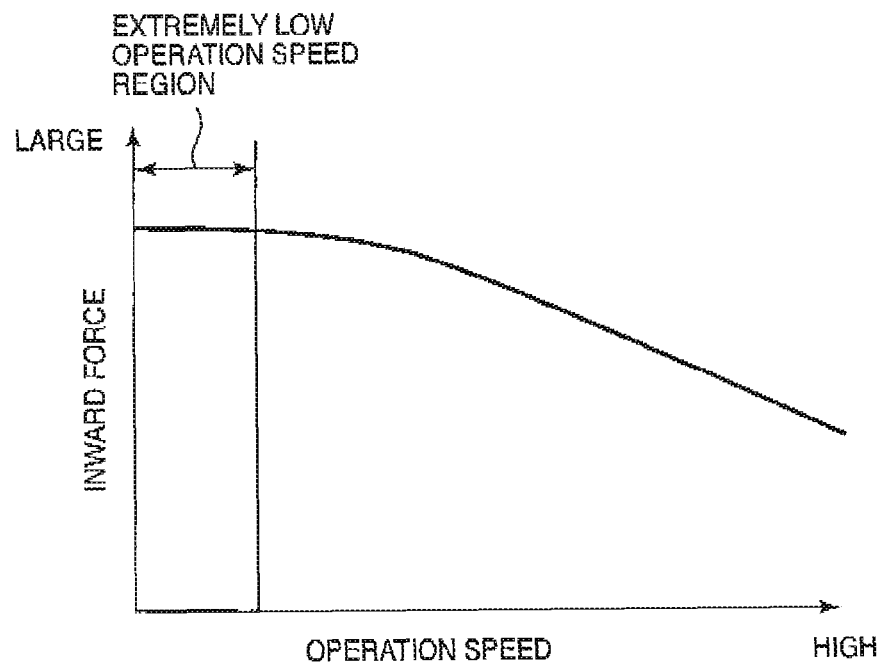
FIG. 2 is a diagram showing a relationship between an operation speed of the hydraulic shock absorber and a frictional resistance between a seal member and a piston rod.

Referring to FIG. 2, the frictional resistance between the oil lip 3 and the piston rod 2 decreases depending on the operation speed of the hydraulic shock absorber D1, excluding the extremely low speed region. Therefore, a sufficient damping force is generated to suppress oscillation of the hydraulic shock absorber D1 when the hydraulic shock absorber D1 operates in the extremely low speed region, while smooth elongation/contraction of the hydraulic shock absorber D1 is ensured by decreasing the frictional resistance between the oil lip 3a and the piston rod 2 when the hydraulic shock absorber D1 operates at an operation speed above the extremely low speed region. According to this invention, therefore, a sufficient damping force to suppress oscillation is obtained in the extremely low operation speed region of the hydraulic shock absorber D1 without affecting the riding comfort of the vehicle.

In the embodiment described above, the controller 4b is programmed not to apply the direct-current voltage to the polymer actuator 4a only in the extremely low operation speed region. The extremely low operation speed region may be set arbitrarily. However, since the operation speed of a hydraulic shock absorber when a vehicle changes lanes at a high running speed is about 0.02 meters/sec, the extremely low operation speed region should cover this value.

The characteristics of the frictional resistance shown in FIG. 2 is merely an example, It is possible to decrease the frictional resistance in a stepwise fashion with several steps in a region above the extremely low operation speed region. It is preferable to program the controller 4b to stop increasing the direct-current voltage applied to the polymer actuator 4a when the operation speed of the hydraulic shock absorber D1 reaches a predetermined speed so as to prevent the frictional resistance between the oil lip 3a and the piston rod 2 from becoming smaller than a minimum value.

As described above, since the frictional resistance between the seal member 3 and the piston rod 2 can be varied arbitrarily according to this invention, it is also preferable to increase the frictional resistance between the seal member 3 and the piston rod 2 when the hydraulic shock absorber D1 approaches its elongation limit or contraction limit so as to prevent a large shock from occurring when the piston rod 2 reaches the elongation limit or contraction limit. Further, when the damping force generated by the hydraulic shock absorber D1 tends to be small irrespective of the operation speed, it is possible to increase the inward force which the polymer actuator 4a exerts on the seal member 3 over the entire operation speed region to compensate for a deficit in the damping force.

In the embodiment described above, the polymer actuator 4a is formed in a ring-shape so as to exert an inward force on the oil lip 3a, but it is possible to arrange the polymer actuator 4a to decrease the inherent inward resilient force which the oil lip 3a applies to the piston rod 2. This setting can be materialized by incorporating the polymer actuator 4a into the oil lip 3a or adhering the polymer actuator 4a on the outer circumference of the oil lip 3a such that the polymer actuator 4a can exert an outward force on the oil lip 3a upon application of the direct-current voltage.

The polymer actuator 4a expands upon application of the direct-current voltage, but it is possible to construct the polymer actuator 4a to shrink upon application of the direct-current voltage. Further, it is possible to construct the polymer actuator 4a to expand and shrink depending on a flow direction of the applied direct current. Instead of constructing the polymer actuator 4a in a ring-shape, it may be constructed in a string form such that it is wound partially or entirely onto the outer circumference of the oil lip 3a and both ends of the string are fixed to the outer circumference of the oil lip 3a. When a string-form polymer actuator 4a expands or shrinks, the oil lip 3a expands or shrinks partially or entirely, thereby varying the frictional resistance between the oil lip 3a and the piston rod 2.

Since the polymer actuator 4a operates at a low voltage and its response speed is high, the frictional resistance between the oil lip 3a and the piston rod 2 can be regulated at high speed without consuming energy. It is still possible, however, to construct the actuator from a piezoelectric element or a magnetostrictor, which are known to bring about an inverse piezoelectric effect to induce expansion upon application of a direct-current voltage. When the actuator is constructed from a piezoelectric element or a magnetostrictor, it is possible to dispose plural actuators on the outer circumference of the oil lip 3a such that the plural actuators thrust the oil lip 3a towards the outer circumference of the piston rod 2 from various directions when a direct-current voltage is applied. Still further, it is possible to fit a C-ring onto the outer circumference of the oil lip 3a and connect both ends of the C-ring by a linear actuator such that the actuator can increase or decrease the diameter of the C-ring upon application of a direct current to the actuator.

It is also possible to form a chamber on the outer circumference of the oil lip 3a and introduce pressure into the chamber so as to exert an inward force on the oil lip 3a.

As described above, any type of actuator can be used in this invention as long as it can vary the frictional resistance between the seal member 3 and the piston rod 2.

Figure 3:
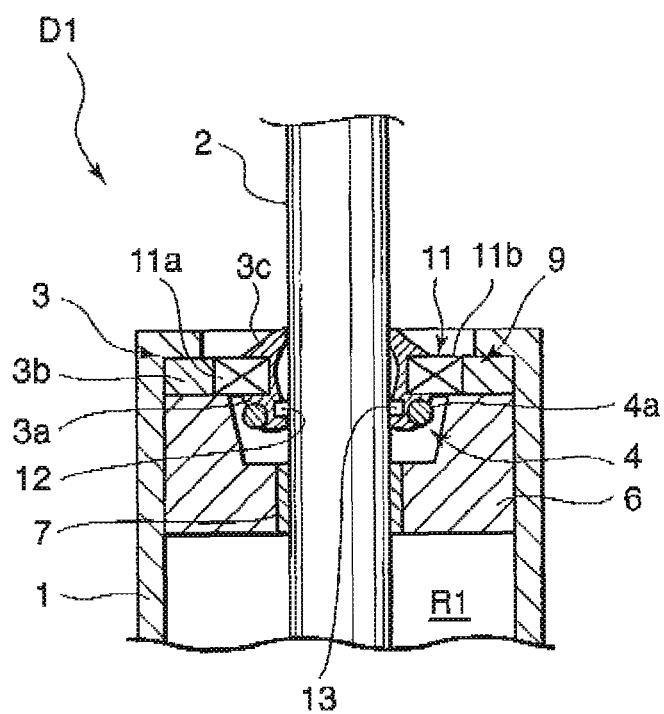
FIG. 3 is an enlarged sectional view of essential parts of a hydraulic shock absorber according to a second embodiment of this invention.

Referring to FIG. 3, a second embodiment of this invention will be described.

This embodiment differs from the first embodiment in the constitution of the frictional resistance regulating mechanism 4. The other components of the hydraulic shock absorber D1 are identical to those of the first embodiment.

The frictional resistance regulating mechanism 4 according to this embodiment comprises a generator 9 which generates power according to an operation of the hydraulic shock absorber D1, and a polymer actuator 4a which exerts an inward force on the seal member 3 in accordance with a direct current supplied from the generator 9. The polymer actuator 4a may be identical to that of the first embodiment.

The generator 9 comprises a magnetic field system 11 fixed to the cylinder 1 to form a magnetic field traversing the piston rod 2, and a pair of electric terminals 12, 13 provided on the inner circumference of the oil lip 3a so as to slide on the outer circumference of the piston rod 2.

The magnetic field system 11 comprises a pair of magnets 11a, 11b disposed on the inner circumference of the lip retaining ring 3b at intervals of 180 degrees. The N-pole of the magnet 11a and the S-pole of the magnet 11b are directed towards the piston rod 2, respectively.

The piston rod 2 is constructed from a conducting material. When the piston rod 2 displaces in the magnetic field formed by the magnetic field system 11 in a direction orthogonal to the magnetic field, or in other words in a vertical direction in the figure, an eddy current is generated in the piston rod 2 due to electromagnetic induction. The eddy current is extracted from the electric terminals 12, 13 which slide on the outer circumference of the piston rod 2 and supplied to the polymer actuator 4a. It should be noted that the electric terminals 12, 13 can be disposed in any location as long as they can extract eddy current from the piston rod 2.

The generator 9 changes the direction of the direct current output from the electric terminals 12, 13 depending on the displacement direction of the piston rod 2. To cope with a resultant change in the polarity of the extracted current, the direct current output from the electric terminals 12, 13 is first rectified by a rectifier using a known bridge circuit and then supplied to the polymer actuator 4a. An amplifier may be interposed between the rectifier and the polymer actuator 4a.

It is also possible to use the magnetic field generated by the eddy current in the piston rod 2 to generate an induced current in a coil and impress the induced current voltage on the polymer actuator 4a.

When the operation speed of the hydraulic shock absorber D1 is in the extremely low operation seed region, the power generation amount of the generator 9 is small, and the impressed voltage on the polymer actuator 4a is low. As a result, the frictional resistance exerted by the oil lip 3a on the outer circumference of the sliding piston rod 2 is at a maximum. Accordingly, the hydraulic shock absorber D1 generates a firm damping force sufficient to suppress oscillation of a small amplitude.

As the operation speed of the hydraulic shock absorber D1 increases, the power generation amount of the generator 9 increases, and the inward force which the polymer actuator 4a exerts on the seal member 3 decreases, thereby ensuring smooth elongation/contraction of the hydraulic shock absorber D1 and improving the riding comfort of the vehicle.

The polymer actuator 4a is configured such that its inner diameter increases beyond the outer diameter of the oil lip 3a, when the impressed voltage becomes higher than a predetermined voltage. In other words, when the impressed voltage becomes higher than the predetermined voltage, the polymer actuator 4a does not exert any inward force on the oil lip 3a, and the oil lip 3a contacts the piston rod 2 by its own resilient force. This setting is preferable to ensure a necessary sealing performance in the oil lip 3a even when the operation speed of the hydraulic shock absorber D1 reaches a maximum.

According to this embodiment, a sufficient damping force is ensured in the extremely low operation speed region of the hydraulic shock absorber D1 without affecting the riding comfort of the vehicle as in the case of the first embodiment.

Further, this embodiment does not require an external power source such as the battery 4e and an external control measure such as the controller 4b and the stroke sensor 4c. Moreover, the composition of the frictional resistance regulating mechanism 4 can be simplified in comparison with the first embodiment.

Figure 4:
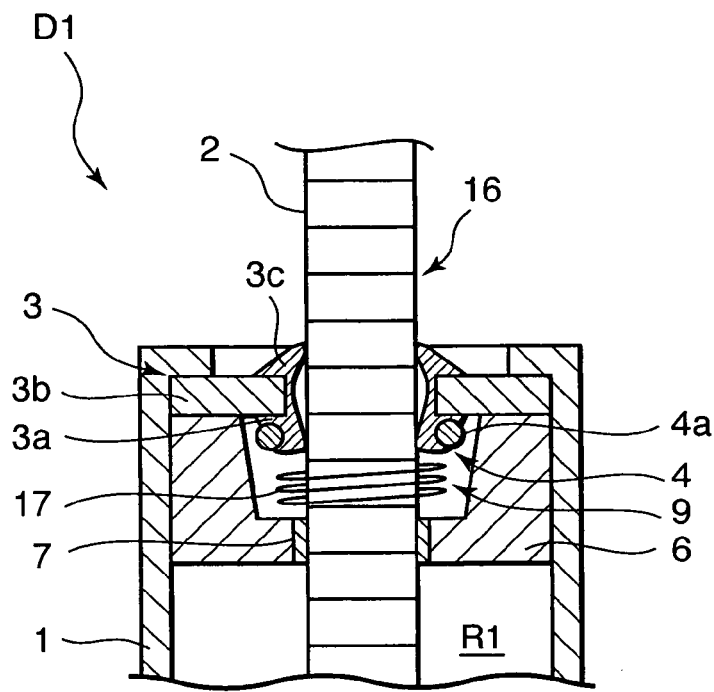
FIG. 4 is similar to FIG. 3, but shows a third embodiment of this invention.

Referring to FIG. 4 a third embodiment of this invention will be described.

This embodiment differs from the second embodiment in the composition of the generator 9. The other components of the hydraulic shock absorber D1 are identical to those of the second embodiment.

The generator 9 according to this embodiment comprises a magnetic field system 16 incorporated in the piston rod 2 such that the N-pole and S-pole are formed alternately on the piston rod 2 in the axial direction and a coil 17 disposed on the inner circumference of the rod guide 6 below the oil lip 3a so as to surround the piston rod 2.

According to the relative displacement between the piston rod 2 and the cylinder 1, the N-pole and the S-pole pass alternately through the coil 17 and generates an induced electromotive force in the coil 17. Since the direct current extracted from both ends of the coil 17 changes its flow direction depending on the displacement direction of the piston rod 2, the direct current extracted from both ends of the coil 17 is first rectified and then supplied to the polymer actuator 4a, as in the case of the second embodiment.

According to this embodiment, a sufficient damping force is ensured in the extremely low operation speed region of the hydraulic shock absorber D1 without affecting the riding comfort of the vehicle as in the case of the first embodiment.

Further, this embodiment does not require an external power source such as the battery 4e and an external control measure such as the controller 4b and the stroke sensor 4c as in the case of the second embodiment. Moreover, the composition of the frictional resistance regulating mechanism 4 can be simplified in comparison with the first embodiment.

Figure 5:
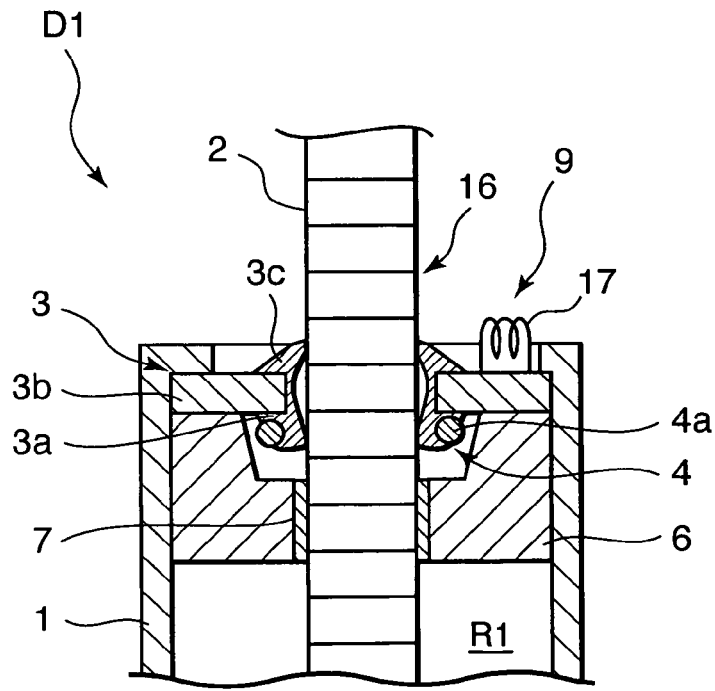
FIG. 5 is similar to FIG. 3, but shows a fourth embodiment of this invention.

Referring to FIG. 5, a fourth embodiment of this invention will be described.

This embodiment differs from the third embodiment in the disposition of the coil 17. The other components of the hydraulic shock absorber D1 are identical to those of the third embodiment.

According to this embodiment, the coil 17 is disposed such that an end thereof is directed towards the piston rod 2 while the other end thereof is directed in a direction heading away from the piston rod 2, or in other words the coil winding direction is orthogonal to the piston rod 2. The coil 17 disposed in this way also generates power as the piston rod 2 and the cylinder 1 perform relative displacement in the axial direction. It is also possible to dispose a plurality of coils 17 radially around the piston rod 2.

This generator 9 also changes the flow direction of the direct current depending on the displacement direction of the piston rod 2 with respect to the cylinder 1. Therefore, the direct current extracted from both ends of the coil 17 has to be rectified and then supplied to the polymer actuator 4a.

According to this embodiment, a sufficient damping force is ensured in the extremely low operation speed region of the hydraulic shock absorber D1 without affecting the riding comfort of the vehicle as in the case of the third embodiment.

Further, this embodiment does not require an external power source such as the battery 4e and an external control measure such as the controller 4b and the stroke sensor 4c as in the case of the second and the third embodiments. Moreover, the composition of the frictional resistance regulating mechanism 4 can be simplified in comparison with the first embodiment.

The contents of Tokugan 2008-058246, with a filing date of Mar. 7, 2008 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, any working fluid such as gas, water, a water solution, an electroviscous fluid, and a magneto-viscous fluid may be used as working fluid for the hydraulic shock absorber D1 instead of working oil. The damping force generating mechanism is not limited to the choke 5. It may be constituted by a valve, an orifice, or an electromagnetic damping force generating mechanism. The location of the damping force generating mechanism is not limited to the piston P.

The cylinder-inserted body is not limited to the piston rod 2. This invention can be applied to a front fork for a motorcycle comprising an outer tube and an inner tube nested in the outer tube. In this case, the outer tube constitutes the cylinder and the inner tube constitutes the cylinder-inserted body.

In each of the embodiments described above, the seal member 3 has a construction whereby the oil lip 3a supported by the cylinder 1 is caused to slide on the outer circumference of the piston rod 2. In other words, the seal member supported by the cylinder is caused to contact the cylinder-inserted body resiliently. This invention may also be applied to a sealing structure in which the seal member supported by the cylinder-inserted body such as an inner tube of a front fork, is caused to contact resiliently the cylinder such as an outer tube of the front fork.

The seal member 3 in each of the embodiments described above comprises the oil lip 3a and the dust lip 3c, the respective tips of which contact the outer circumference of the piston rod 2. However, various variations are possible with respect to the structure of the seal member 3. For example, the seal member 3 may be formed in the shape of an O-ring, an inner circumferential surface or an outer circumferential surface of which is set to be a sliding surface, while an actuator for regulating the frictional resistance of the seal member 3 is disposed on the outer circumferential surface or the inner circumferential surface of same.

The embodiments of this invention in which an exclusive property or privilege is claimed are defined as follows:
1. A fluid shock absorber comprising:
   a cylinder;
   a cylinder-inserted body inserted into the cylinder and performing a relative displacement in an axial direction at a relative displacement speed with respect to the cylinder;

a damping force generating mechanism that generates a fluid damping force against the relative displacement of the cylinder-inserted body with respect to the cylinder in the axial direction;

a seal member including a ring-shaped sliding surface and interposed between the cylinder and the cylinder-inserted body; and a frictional resistance regulating mechanism provided in the cylinder, the frictional resistance regulating mechanism regulating a frictional resistance between the seal member and the cylinder-inserted body, so that when the relative displacement speed is increasing but is less than a predetermined speed greater than zero, the frictional resistance stays the same, and when the relative displacement speed is increasing and equal to or greater than the predetermined speed, the frictional resistance decreases, the frictional resistance regulating mechanism including an actuator having a ring-shape which exerts a radial force on the seal member and is configured to change the frictional resistance by changing a diameter of the actuator, and a generator that generates a direct-current power in every instance that relative displacement occurs between the cylinder-inserted body and the cylinder in the axial direction and impresses the direct-current power directly on the actuator, wherein the generator is configured to increase a voltage of the direct-current power as the relative displacement speed between the cylinder-inserted body and the cylinder in the axial direction increases, all of the direct-current power generated by the generator being directly applied to the actuator, wherein the direct-current power is directly impressed on the actuator so that no controller regulates the direct-current power applied to the actuator, the actuator is constituted by a polymer actuator which deforms upon impression of the direct-current power to the polymer actuator and is configured to enlarge in diameter as the direct-current power impressed on the polymer actuator increases, the seal member comprises an oil lip that is disposed on a radially inner side of the actuator and is supported by the cylinder so as to be in contact elastically with the cylinder-inserted body, and the actuator and the generator are provided separately.

2. The fluid shock absorber as defined in claim 1, wherein the cylinder-inserted body is constructed from a conducting material, and the generator comprises:

a magnet which is fixed to the cylinder and forms a magnetic field traversing the cylinder-inserted body, and a pair of electric terminals sliding on the cylinder-inserted body.

3. The fluid shock absorber as defined in claim 1, wherein the generator comprises:

a magnetic field system constituted by magnets incorporated into the cylinder-inserted body so as to form an N-pole and an S-pole alternately on the cylinder-inserted body in the axial direction, and a coil which the cylinder-inserted body penetrates, and is configured to generate the direct-current power.

4. The fluid shock absorber as defined in claim 1, wherein the generator comprises:

a magnetic field system constituted by magnets incorporated into the cylinder-inserted body so as to form an N-pole and an S-pole alternately on the cylinder-inserted body in the axial direction, and a coil, a tip of which is directed to the cylinder-inserted body while another tip is directed in a direction heading away from the cylinder-inserted body, and is configured to generate the direct-current power.

5. The fluid shock absorber as defined in claim 1, wherein the generator is disposed within the cylinder.

6. A fluid shock absorber comprising:

a cylinder;

a cylinder-inserted body inserted into the cylinder and performing a relative displacement in an axial direction at a relative displacement speed with respect to the cylinder;

a damping force generating mechanism that generates a fluid damping force against the relative displacement of the cylinder-inserted body with respect to the cylinder in the axial direction;

a seal member including a ring-shaped sliding surface and interposed between the cylinder and the cylinder-inserted body; and a frictional resistance regulating mechanism provided in the cylinder, the frictional resistance regulating mechanism regulating a frictional resistance between the seal member and the cylinder-inserted body so that when the relative displacement speed between the cylinder-inserted body and the cylinder in the axial direction is increasing but is less than a predetermined speed greater than zero, the frictional resistance stays the same, and when the relative displacement speed is increasing and equal to or greater than the predetermined speed, the frictional resistance decreases, the frictional resistance regulating mechanism including:

an actuator having a ring-shape which exerts a radial force on the seal member and is configured to change the frictional resistance by changing a diameter of the actuator, and a generator that generates a direct-current power in every instance that relative displacement occurs between the cylinder-inserted body and the cylinder in the axial direction and impresses the direct-current power directly on the actuator, wherein the generator is configured to increase a voltage of the direct-current power as the relative displacement speed between the cylinder-inserted body and the cylinder in the axial direction increases, all of the direct-current power generated by the generator is directly applied to the actuator, wherein the direct-current power is directly impressed on the actuator so that no controller regulates the direct-current power applied to the actuator, the actuator is constituted by a piezoelectric element or a magnetostrictor, which brings about an inverse piezoelectric effect upon impression of the direct-current power to the actuator and configured to decrease the frictional resistance as the voltage of the direct-current power increases, the seal member comprises an oil lip that is disposed on a radially inner side of the actuator and supported by the cylinder so as to be in contact elastically with the cylinder-inserted body, and the actuator and the generator are provided separately.

7. The fluid shock absorber as defined in claim 6, wherein the cylinder-inserted body is constructed from a conducting material, and the generator comprises:

a magnet which is fixed to the cylinder and forms a magnetic field traversing the cylinder-inserted body; and a pair of electric terminals sliding on the cylinder-inserted body.

* * * * *